E. C. SEVIGNY.
AUXILIARY AIR INLET DEVICE FOR INTERNAL COMBUSTION ENGINES.
APPLICATION FILED FEB. 8, 1917.
1,241,155.
Patented Sept. 25, 1917.
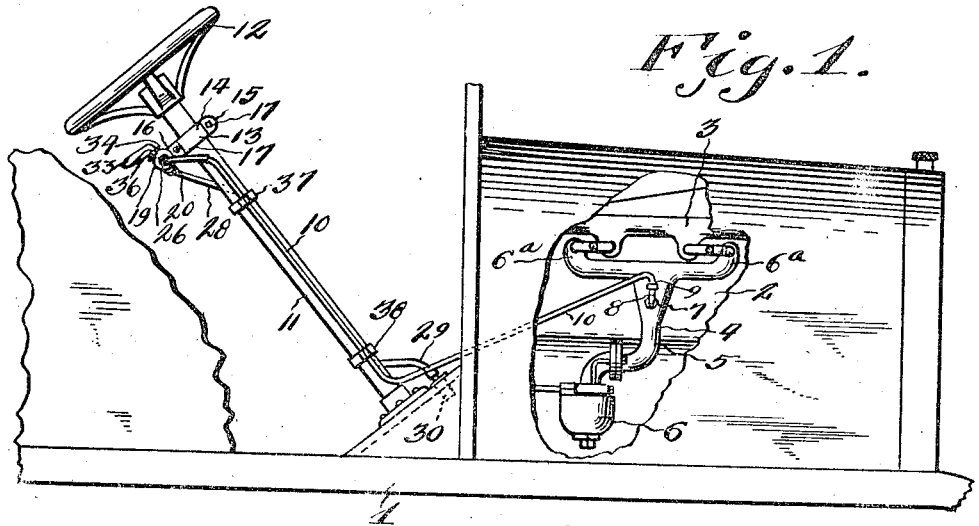
Inventor
Edward C. Sevigny
By Philip A. H. Serrell
his Attorney

UNITED STATES PATENT OFFICE.

EDWARD C. SEVIGNY, OF JACKSONVILLE, FLORIDA, ASSIGNOR OF ONE-HALF TO EBENEZER S. BACON, OF JACKSONVILLE, FLORIDA.

AUXILIARY AIR-INLET DEVICE FOR INTERNAL-COMBUSTION ENGINES.

1,241,155.  Specification of Letters Patent.  Patented Sept. 25, 1917.

Application filed February 8, 1917. Serial No. 147,353.

*To all whom it may concern:*

Be it known that EDWARD C. SEVIGNY, citizen of the United States of America, residing at Jacksonville, in the county of Duval and State of Florida, has invented certain new and useful Improvements in Auxiliary Air-Inlet Devices for Internal-Combustion Engines, of which the following is a specification, reference being had therein to the accompanying drawing.

This invention relates to manually operated devices adapted to admit air to the gaseous mixture in an inlet manifold pipe, used with internal combustion engines and with particular reference to internal combustion engines for propelling motor driven vehicles.

The object of the invention is to provide means for admitting air, to the gaseous mixture as it passes through the intake manifold on its way from the carbureter, to the cylinder or cylinders, of the internal combustion engine. The means for controlling the admission of air, being mounted within close proximity to the steering wheel and preferably upon the steering post.

A further object of the invention is to provide a manually operated valve upon the steering-post of a motor driven vehicle, whereby air may be admitted to the inlet manifold of an internal combustion engine, by means of a pipe connected to the outlet of said valve. The inlet of said valve being connected to a pipe, which communicates with the atmosphere remote from the driver and forming an intake for admitting air at the same time removing the noise caused by the sucking in of said air from juxtaposition to the driver.

A further object is to provide for preventing foreign matter from being sucked into the intake, such for instance, as dust, dirt or grit, thereby providing efficient means for admitting air wherein the proper seating of intake and exhaust valves is assured.

A further object is to provide means whereby the air will be preheated and will therefore superheat the gasolene, thereby giving more power from a given quantity of fuel and rendering it possible, to increase the speed of the engine, by simply varying the hot air supply.

Other objects will appear and be better understood from the embodiment of the invention of which the following is a specification, reference being had to the accompanying drawings forming part thereof, in which:—

Figure 1, is a view of a conventional form of automobile, showing the invention applied thereto.

Fig. 2 is an enlarged perspective view of the invention, showing one of the pipes coiled around the exhaust manifold so as to preheat the air.

Fig. 3 is a section on line 3—3 of Fig. 2, showing the valve structure.

Fig. 4 is a detail view of the valve, showing means for preventing the accidental movement of said valve.

Fig. 5 is a detail view of the intake end of the intake pipe.

Referring to the drawings 1 designates a conventional form of automobile, having a conventional form of internal combustion engine 2, which is provided with the exhaust manifold 3 and the intake manifold 4. The intake manifold is of the usual T-shape, the arm 5 of which connects to the carbureter 6, while the arms 6ᵃ communicate with the cylinders of the engine. Threaded or otherwise secured, as at 7, to the arm 5 of the intake manifold in an L 8, which communicates with the interior of the intake manifold. Connected to the L 8 as at 9 is a pipe 10, the purpose of which will presently appear. Mounted upon the steering post 11 and within close proximity to the steering wheel 12 is a collar 13 formed of two sections 14, each section being provided with ears 15 and 16 for the reception of bolts 17, whereby the clamp may be securely clamped to the steering post. Mounted upon one of the bolts 17 and securely clamped between the ears 16 is an integral lug 18, of the plug valve 19. The plug valve 19 comprises the casing 20 having lugs 21 and 22, which are provided with passages 23 and 23ᵃ which are adapted to register with the passage 24 of the valve 25. The pipe 10 is connected to the lug 22 by means of the flanged cap 26. Connected to the lug 21 by means of the flanged cap 27 is one end of the intake pipe 28, which in turn has its other end 29 connected to the intake fitting 30. The intake fitting 30 is provided with a series of fine wire screens 31, between which, a finer straining material may be placed, if desired, this material 32, may be of cotton, or any other suitable material. The intake fitting 30 may be secured to any part of the car, remote from the chauffeur, the valve 24 is provided with a handle 33, whereby the amount of air admitted may be increased or diminished according to the wishes of the driver, or limited by suction impulses of the pistons in the cylinders. The vertical portion of the handle is provided with teeth 34, which are engaged by a spring actuated detent 35, carried in the casing 36 of the valve to prevent the same from being accidentally moved without exerting considerable pressure upon the handle. The pipes 10 and 28 are further clamped and held upon the steering post by the clamps 37 and 38.

It will be noted, by reference to Fig. 2, that if it is desired to admit preheated air to the intake manifold, it will only be necessary to pass the pipe 10, several times around the exhaust manifold, and clamp the same by means of the clamp 39, which will keep the coils 10$^a$ in contact with the hot surface of the exhaust pipe, thereby preheating the air and consequently super-heating the gasolene before it enters the cylinders.

Having thus described my invention what I claim and desire to secure by Letters Patent is:—

1. In a device for manually controlling the admission of air to the gaseous mixture in the intake manifold between the carbureter and the intake ports of an internal combustion engine, said device being located upon the steering post and in juxtaposition to the steering wheel and comprising a two way valve, the inlet end of said valve being connected by means of a pipe with an inlet end remote from the steering wheel and having screens to prevent entrance of foreign substances and a pipe connected to the outlet end of said valve and passing around and clamped to the exhaust manifold and having its free end connected to the intake manifold.

2. In combination with the steering means of a motor vehicle; a valve on said means in close position to the operator's hands; a connection between said valve and the intake manifold of the motor; and an air intake member connected to said valve and having its intake end remote from said valve.

In testimony whereof I hereunto affix my signature.

EDWARD C. SEVIGNY